(12) United States Patent
Langenborg et al.

(10) Patent No.: US 11,783,098 B2
(45) Date of Patent: Oct. 10, 2023

(54) SYSTEM AND METHOD TO GENERATE WELLBORE LAYOUTS

(71) Applicant: RS Energy Group Topco, Inc., Calgary (CA)

(72) Inventors: Erik Langenborg, Quakertown, PA (US); Livan B. Alonso, Wayne, PA (US); Manuj Nikhanj, Calgary (CA); David Howard, Calgary (CA); Alexandre Paris, Philadelphia, PA (US); Abbie Rolf von den Baumen, Calgary (CA)

(73) Assignee: RS Energy Group Topco, Inc., Calgary (CA)

( * ) Notice: Subject to any disclaimer, the term of this patent is extended or adjusted under 35 U.S.C. 154(b) by 86 days.

(21) Appl. No.: 17/189,419

(22) Filed: Mar. 2, 2021

(65) Prior Publication Data

US 2021/0279376 A1    Sep. 9, 2021

Related U.S. Application Data

(60) Provisional application No. 62/984,509, filed on Mar. 3, 2020.

(51) Int. Cl.
*G06F 30/10* (2020.01)
*G06Q 10/101* (2023.01)
(Continued)

(52) U.S. Cl.
CPC ............. *G06F 30/10* (2020.01); *E21B 41/00* (2013.01); *G06Q 10/06313* (2013.01);
(Continued)

(58) Field of Classification Search
CPC .. G06F 30/10; G06F 2111/02; G06F 2111/04; G06F 2111/06; G06F 30/00;
(Continued)

(56) References Cited

U.S. PATENT DOCUMENTS

| 2010/0042458 | A1* | 2/2010 | Rashid | E21B 43/122 |
| | | | | 703/10 |
| 2011/0161133 | A1* | 6/2011 | Staveley | E21B 44/00 |
| | | | | 705/7.11 |

OTHER PUBLICATIONS

International Search Report and Written Opinion from corresponding PCT International Application No. PCT/US2021/020371 dated May 20, 2021.
(Continued)

*Primary Examiner* — Brian S Cook
(74) *Attorney, Agent, or Firm* — DLA Piper LLP (US)

(57) ABSTRACT

A system and method of generating a wellbore layout are disclosed herein. A computing system receives, from a client device, one or more parameters associated with a target location for the target wellbore layout. The computing system receives, from the client device, one or more constraints for the target wellbore layout. The computing system generates a plurality target wellbore layout based on the parameters and constraints in accordance with a plurality of configurations as defined by one or more genetic algorithms. The computing system evaluates each target wellbore layout to generate an overall fitness score. The computing system selects a target wellbore layout with the highest scoring score of each generated overall fitness score, repeating the process until an optimal wellbore layout is selected.

14 Claims, 8 Drawing Sheets

(51) Int. Cl.
   *G06Q 10/10*      (2023.01)
   *G06Q 10/0631*    (2023.01)
   *E21B 41/00*      (2006.01)
   *G06F 111/06*     (2020.01)
   *G06F 111/04*     (2020.01)
   *G06F 111/02*     (2020.01)

(52) U.S. Cl.
   CPC ......... *G06Q 10/101* (2013.01); *G06Q 10/103* (2013.01); *G06F 2111/02* (2020.01); *G06F 2111/04* (2020.01); *G06F 2111/06* (2020.01)

(58) Field of Classification Search
   CPC . E21B 41/00; E21B 7/04; E21B 44/00; E21B 41/0092; E21B 41/0099; G06Q 10/06313; G06Q 10/101; G06Q 10/103; G06Q 50/02
   See application file for complete search history.

(56) References Cited

OTHER PUBLICATIONS

International Report on Patentability from corresponding PCT International Application No. PCT/US2021/020371 dated Sep. 15, 2022.

\* cited by examiner

FIG. 3A1

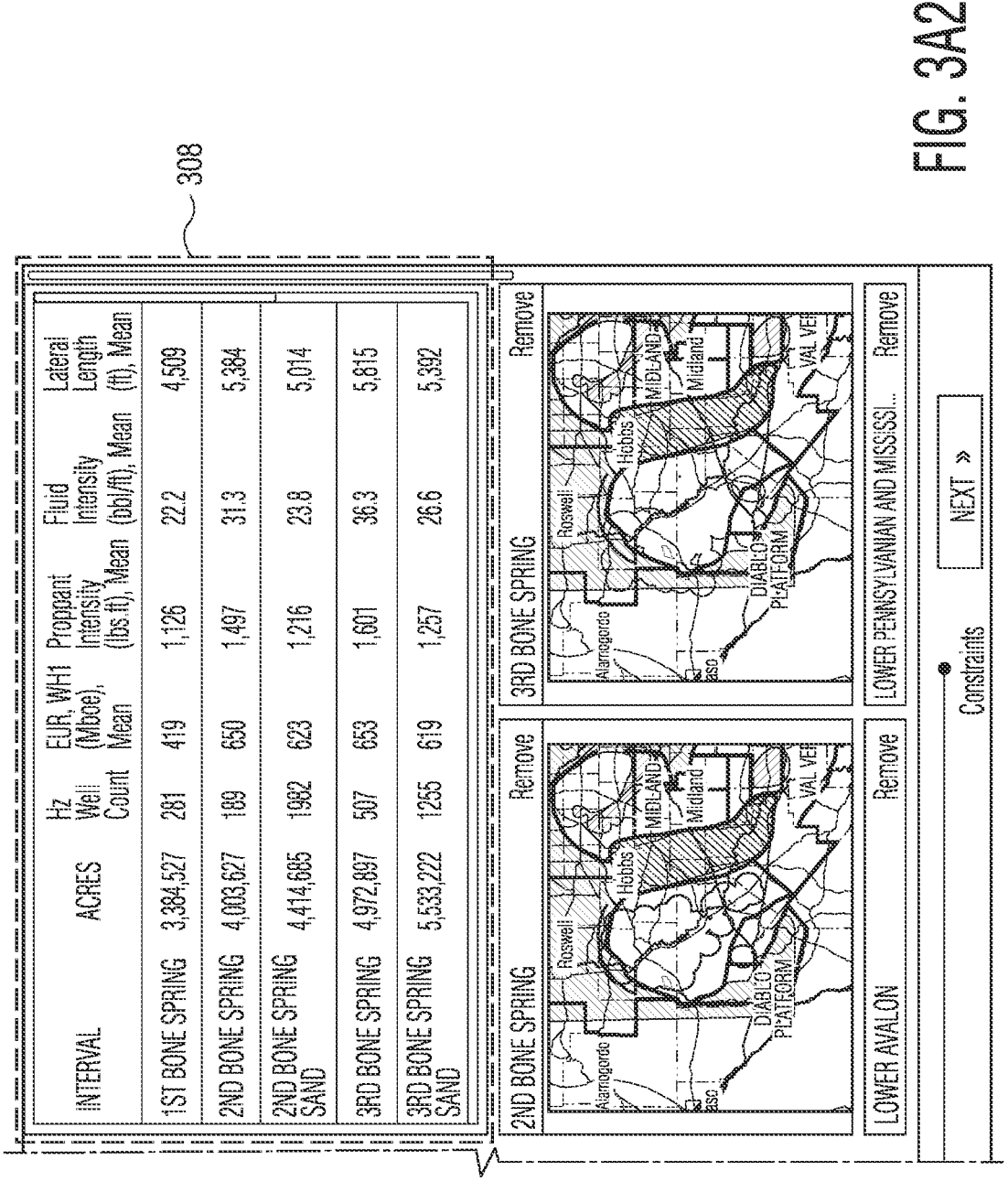
FIG. 3A2

SPACING & LATERAL LENGTH

☑ New DSUs  ☑ Infills

Lateral Lengths: ☑ 5,000  ☑ 7,500  ☑ 10k  ☐ 12k  ☐ 15k

── 352

COMPLETION DESIGNS

AVERAGE RS WELL COST ESTIMATE FOR THIS PLAY: $6.62M ⓘ     COST SCALER: 1.1     + ADD

| Name | Water Intensity (gal/ft) | Average Stage Spacing (ft) | Fluid Intensity (bbl/ft) | Proppant Intensity (lbs/ft) | Action |
|---|---|---|---|---|---|
| Medium (50%) | 1475 | 477 | 30 | 1543 | Remove |
| Large (75%) | 2155 | 314 | 42 | 2354 | Remove |
| Extra Large (95%) | 2955 | 225 | 61 | 2852 | Remove |

── 354

ECONOMIC INPUTS

COMMODITY ASSUMPTIONS
OIL HUB: WTI ▾
GAS HUB: HH ▾

PROCESSING FEES
PROCESSING FEES ($/MMCF): 0.35
NGL YIELD (BBL/MMCF): 100.13
GAS SHRINK (%): 0.23

DIFFERENTIALS
OIL DIFFERENTIAL (%): 1
NGL DIFFERENTIAL (%): 0.35
GAS DIFFERENTIAL (%): 1

ROYALTY RATE
ROYALTY RATE OIL (%): 0.25
ROYALTY RATE GAS (%): 0.05
ROYALTY RATE NGL (%): 0.25

OPERATING AND TRANSPORT
VARIABLE OPEX ($/BOE): 3.13
TRANSPORTATION COST ($/BOE): 1.18
FIXED OPEX ($/WELL/MONTH): 0

SEVERANCE TAX
OIL SEVERANCE TAX (%): 0.06
NGL SEVERANCE TAX (%): 0.09
GAS SEVERANCE TAX (%): 0.08

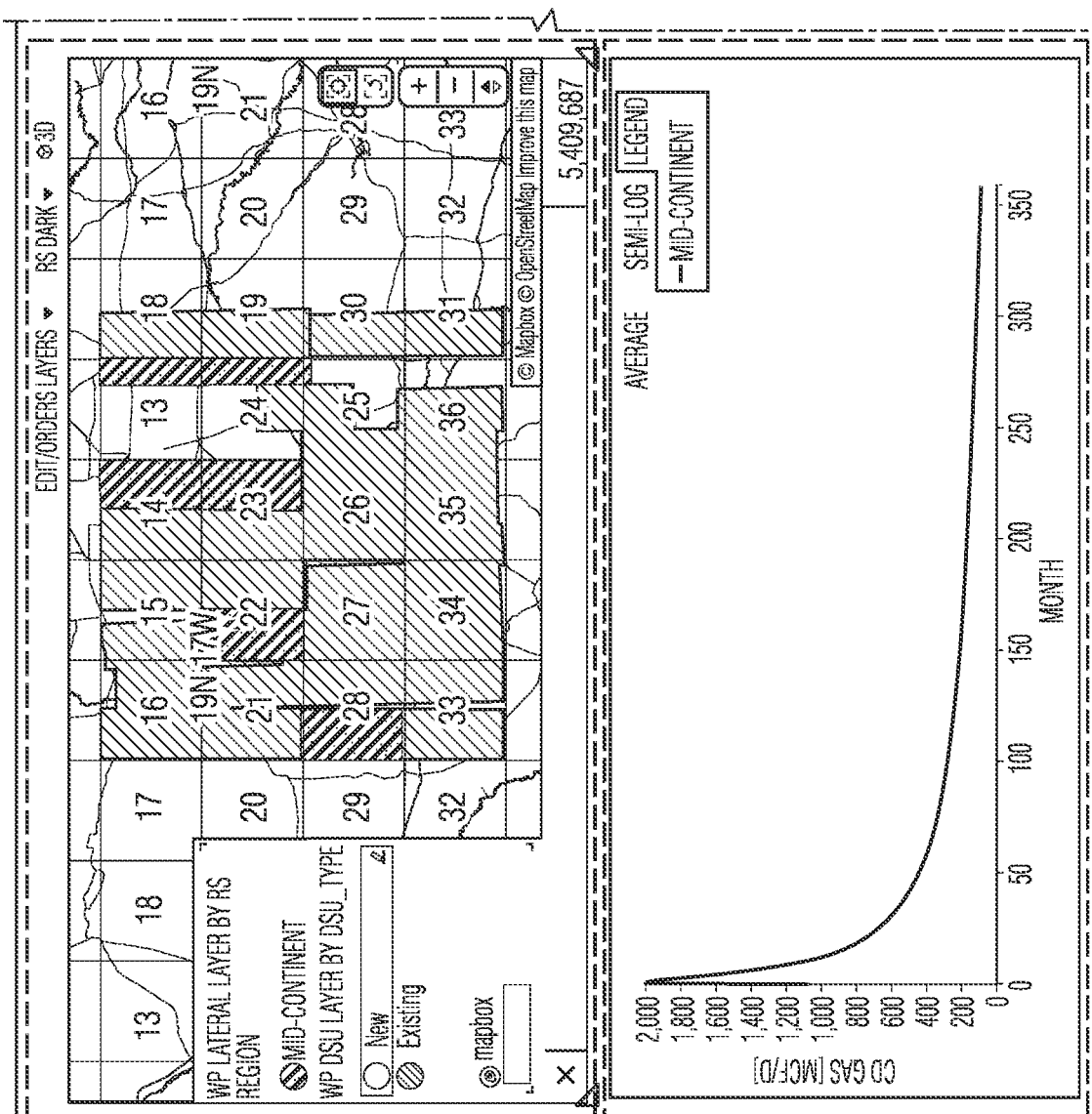
FIG. 3C1

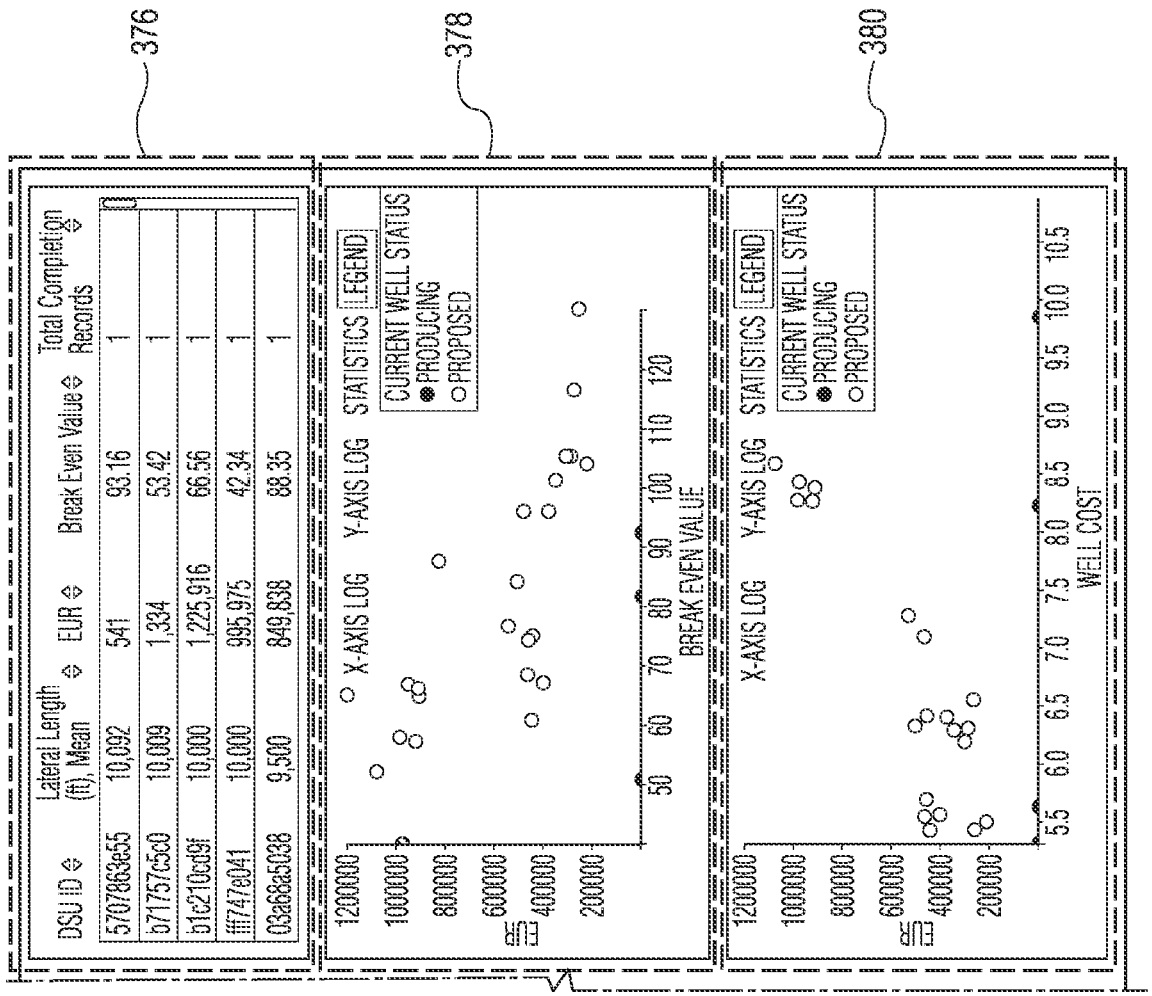
FIG. 3C2

SYSTEM AND METHOD TO GENERATE WELLBORE LAYOUTS

FIELD OF DISCLOSURE

The present disclosure generally relates to a method and a system to a wellbore layout.

BACKGROUND

Horizontal drilling has become a widespread practice that has become increasingly easier to justify. Horizontal drilling increases the contact area of a wellbore with the reservoir (i.e., a thin stratigraphic interval). An ideal drilling workflow conventionally requires collaboration between integrated team members including geologists, geophysicists, and engineers (e.g., wellsite, drilling, and completion) who work together to select the drilling target, surface and kickoff locations, and the optimal wellbore path, all designed to satisfy engineering and geological constraints.

SUMMARY

In some embodiments, a method of generating a wellbore layout is disclosed herein. A computing system receives, from a client device, one or more parameters associated with a target location for the target wellbore layout. The computing system receives, from the client device, one or more constraints for the target wellbore layout. The computing system generates a plurality target wellbore layout based on the parameters and constraints in accordance with a plurality of configurations as defined by one or more genetic algorithms. The computing system evaluates each target wellbore layout to generate an overall fitness score, selects the target wellbore layouts with the highest scoring score, stochastically modifies these target wellbore layouts, and repeats the process until metrics are satisfied and an optimal target wellbore layout is found.

In some embodiments, a system is disclosed herein. The system includes a processor and a memory. The memory has programming instructions stored thereon, which, when executed by the processor, performs one or more operations. The one or more operations include receiving, from a client device, one or more parameters associated with a target location for the target wellbore layout. The one or more operations further include receiving, from the client device, one or more constraints for the target wellbore layout. The one or more operations further include generating a plurality target wellbore layout based on the parameters and constraints in accordance with a plurality of configurations as defined by one or more genetic algorithms. The one or more operations further include evaluating each target wellbore layout to generate an overall fitness score. The one or more operations further include selecting superior wellbore layouts based on the higher overall fitness scores and iterating on stochastic variations of the highest scoring layouts.

In some embodiments, a non-transitory computer readable medium is disclosed herein. The non-transitory computer readable medium includes one or more instructions which, when executed by one or more processors, cause the one or more processors to perform operations. The operations include receiving, from a client device at a computing system, one or more parameters associated with a target location for the target wellbore layout. The operations further include receiving, from the client device at the computing system, one or more constraints for the target wellbore layout. The operations further include generating, by the computing system, a plurality target wellbore layout based on the parameters and constraints in accordance with a plurality of configurations as defined by one or more genetic algorithms. The operations further include evaluating, by the computing system, each target wellbore layout to generate an overall fitness score. The operations further include selecting, by the computing system, a target wellbore layout that a highest scoring score of each generated overall fitness score.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A1-3A2 are block diagrams illustrating an exemplary graphical user interface, according to example embodiments.

FIG. 3B is a block diagram illustrating an exemplary graphical user interface, according to example embodiments.

FIGS. 3C1 and 3C2 are block diagrams illustrating an exemplary graphical user interface, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Horizontal drilling has become a widespread practice that has become increasingly easier to justify. Horizontal drilling increases the contact area of a wellbore with the reservoir (i.e., a thin stratigraphic interval). An ideal drilling workflow conventionally requires collaboration between integrated team members including geologists, geophysicists, and engineers (e.g., wellsite, drilling, and completion) who work together to select the drilling target, surface and kickoff locations, and the optimal wellbore path, all designed to satisfy engineering and geological constraints.

Conventional well-planning design begins with the identification of the target area of interest and the region to be drilled. A predesigned wellbore path may be positioned in the target zone based on one or more predetermined parameters. In some embodiments, such as when only sparse data is available for the drilling region, planning infill drilling presents a substantial technical challenge.

One or more techniques described herein are directed to a method and a system to generate wellbore layouts. For example, given parameters (e.g., target location) and constraints for the layout request, one or more techniques disclosed herein may generate an optimized or nearly optimized wellbore layout. To do so, the system may leverage supervised classification, unsupervised clustering, and/or expert systems to divide the parameters into distinct operational areas. Operating on each area in parallel, the system may use a combination of genetic algorithms that define various configurations for the wellbore layout. For each proposed layout, the system may generate an overall fitness score that takes into consideration, for example, well cost and well production. The system may optimize the layout design by generating layouts, selecting the layouts which has the highest (or best) overall fitness scores, stochastically adjusting the layouts, and repeating until a finish condition is met.

Further, the one or more techniques discussed herein do not require detailed drilling plan data, such as required by conventional systems. Rather, one or more techniques discussed herein may rely on historical wellbore paths and their limited publicly available information, by leveraging that information to build the wellbore prediction model.

Figure 1:
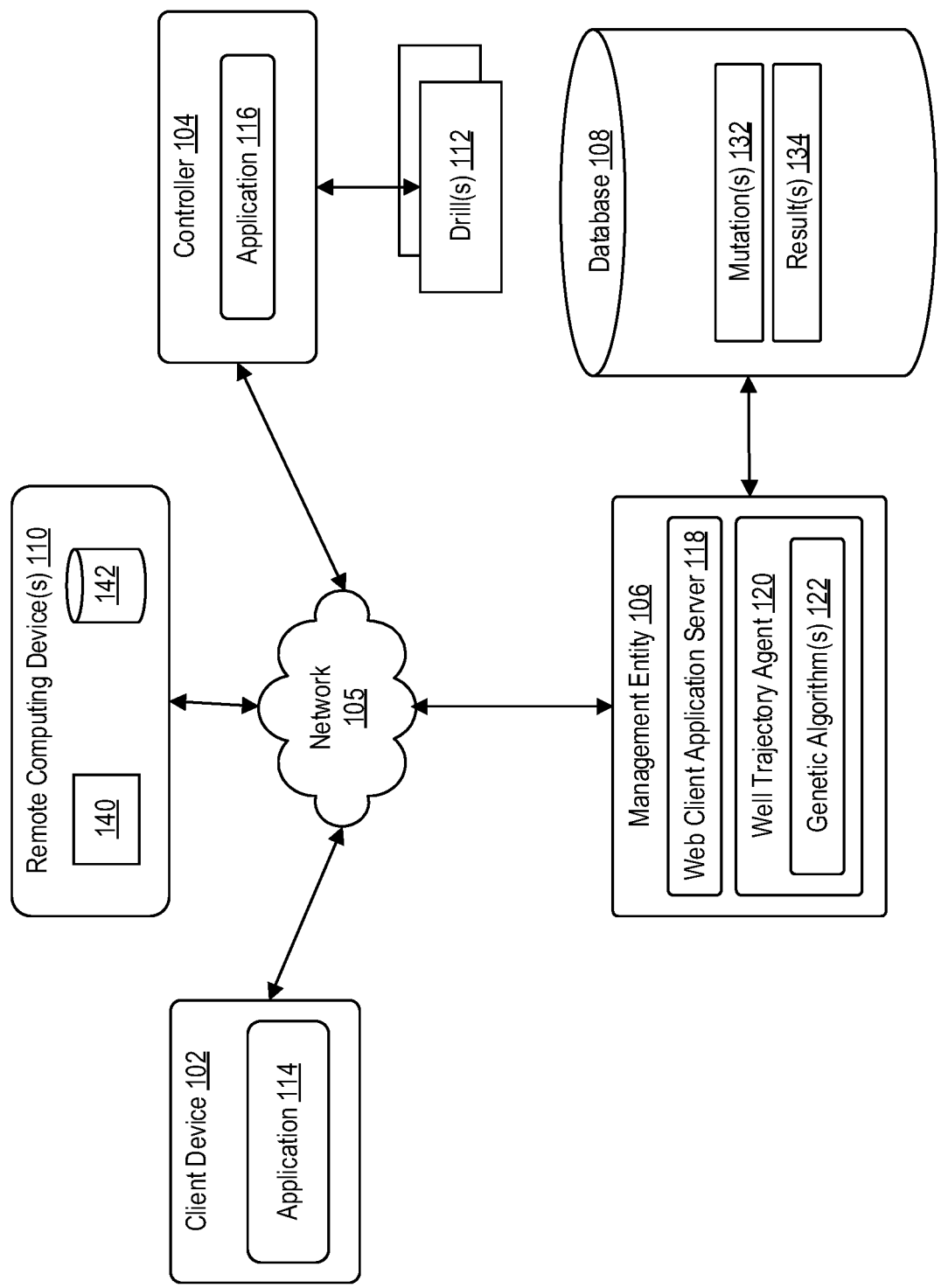
FIG. 1 is a block diagram illustrating an exemplary computing environment, according example embodiments.

FIG. 1 is a block diagram illustrating a computing environment 100, according to one embodiment. Computing environment 100 may include one or more client devices 102, a controller 104, a management entity 106, and one or more remote computing systems 110 communicating via one or more networks 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Client device 102 may be operated by a user. For example, client device 102 may be a mobile device, a tablet, a desktop computer, or any computing system having one or more of the capabilities described herein. Client device 102 may include at least one application 114. Application 114 may be representative of a web browser that allows access to a website or a stand-alone application. Client device 102 may access application 114 to access functionality of management entity 106. Client device 102 may communicate over network 105 to request a webpage or other information, for example, from web client application server 118 of management entity 106. For example, client device 102 may be configured to execute application 114 to access one or more functionalities of management entity 106. The content that is displayed to client device 102 may be transmitted from web client application server 118 to client device 102, and subsequently processed by application 114 for display through a display associated with client device 102.

Management entity 106 may be representative of one or more computer systems associated with an organization. Management entity 106 may include web client application server 118 and well trajectory agent 120. Well trajectory agent 120 may be formed from one or more software modules. The one or more software modules may be collections of instructions stored on a media (e.g., memory associated with management entity 106) that represents a series of machine instructions (e.g., program code) that implements one or more algorithmic steps. Such machine instructions may be the actual computer code a processor associated with management entity 106 interprets to implement the instructions, or, alternatively, may be a higher-level coding of the instructions that are interpreted to obtain the actual computer code. The one or more software modules may also include one or more hardware components. One or more aspects of the algorithm may be performed by the hardware components (e.g., circuitry) itself, rather as a result of an instruction.

Well trajectory agent 120 may be configured to generate a drilling program for a wellbore. In some embodiments, the drilling program may include an optimized or near-optimized wellbore layout for a given location. For example, well trajectory agent 120 may be configured to received, from client device 102, various parameters for a proposed wellbore layout. Given the various parameters, well trajectory agent 120 may generate an optimized or near-optimized wellbore layout for the target location based on, for example, one or more of the various parameters and historical information associated with the target location and/or similar target locations. For example, well trajectory agent 120 may generate the wellbore layout using historical wellbore information associated with wellbore paths that already exist in the target location and in different, but similar locations.

To generate an optimized wellbore layout for a given location, well trajectory agent 120 may be configured to divide the target location into operationally discrete areas of interest. The areas may be isolated and driven by supervised classification, unsupervised cluster, or expert rules that may operate on land plot configurations, existing wellbore paths, geological data, or other geospatial features. These areas of interest may minimize cross region interference to ensure subsequent optimizations can operate independently and in parallel. This may ensure optimized results while maintaining high operational runtime performance.

Within one or many constituent regions, the well trajectory agent 120 may populate a target region, well trajectory agent 120 may generate a score for that particular layout. In some embodiments, the score may correspond to one or more of several objective metrics. In some embodiments, whether the wellbore layout is optimized or near-optimized may depend on a score generated for that particular layout. In some embodiments, well trajectory agent 120 may generate one or more scores that correspond to estimated ultimate recovery (EUR), net present value (NPV), and the like. Because different layouts may generate a different score, well trajectory agent 120 may be configured to generate a plurality of different layouts, based on different parameter adjustments. Well trajectory agent 120 may score each of the plurality of different layouts and select the layout having the highest score. This highest scoring layout may be referred to as an optimized or near-optimized wellbore layout.

As illustrated, well trajectory agent 120 may include one or more genetic algorithms 122. Well trajectory agent 120 may utilize one or more genetic algorithms 122 when generating potential Drilling Spacing Units (DSUs) or specific well configurations ( ) for optimal or near-optimal layout. For example, genetic algorithms 122 may be configured to suggest a wide variety of rule-bounded random potential solutions to DSU placement or completion designs, evaluate the fitness for each solution, and iterate on the most successful solution with a series of more random perturbations. In some embodiments, genetic algorithms' 122 constraints and bounds may be defined by an end user via application 114 of client device 102. In some embodiments, genetic algorithms 122 constraints and bounds may be defined by an administrator of management entity 106.

Controller 104 may be operated by a user. In some embodiments, controller 104 may be operated by a user distinct from the user operating client device 102. Controller 104 may be any general-purpose computer configured to perform the one or more functions disclosed herein. Controller 104 may be in communication with one or more drills 112. For example, controller 104 may be configured to control the one or more processes of a drill 112 during operation.

Controller 104 may include application 116. In some embodiments, application 116 may be a web browser based accessing an application hosted on a remote computing system. In some embodiments, application 116 may be installed on client device 102, and execute thereon. Application 116 may be configured to communicate with client device 102. For example, application 116 may be configured to execute a drilling program based off of input received from client device 102. In some embodiments, application 116 may receive instructions from client device 102 for the specific path of the wellbore.

In some embodiments, management entity 106 may be in communication with one or more remote computing systems 110 (generally "remote computing system 110") communicating over network 105. In some embodiments, well trajectory agent 120 may be configured to gather historical wellbore information associated with one or more wellbores in a target location, as defined by a user. In some embodiments, well trajectory agent 120 may be configured to gather historical wellbore information associated with one or more wellbores in an area associated with a target wellbore, as well as historical wellbore information associated with one or more wellbores in an area potentially indirectly influential to the target wellbore. For example, well trajectory agent 120 may identify those wellbores that are in locations that are similar to the location containing the target wellbore, and retrieve historical wellbore information for wells in those locations. In another example, well trajectory agent 120 may identify those wellbores that were generated by a similar operator.

Well trajectory agent 120 may gather the historical wellbore information by communicating with remote computing systems 110. Each remote computing system 110 may include a processor 140. Processor 140 may be configured to execute one or more processes stored in a memory remote computing system 110. Each remote computing system 110 may further include a database 142. Database 142 may include historical wellbore information associated with one or more wellbores. In some embodiments, database 142 may correspond to a particular geographic location. In some embodiments, database 142 may correspond to a given well operator. In some embodiments, historical wellbore information may be randomly dispersed among all databases 142 of various remote computing systems 110. Upon receiving a request (or query) from well trajectory agent 120, remote computing system 110 may transmit historical wellbore information associated with one or more wells to well trajectory agent 120 for further processing.

Exemplary wellbore information may include engineering data, geological data, reservoir properties data, petrophysical data, and the like. For example, wellbore information may include, but is not limited to:

A. Engineering Data

Reservoir fluid properties—viscosity, specific gravity, density, API, formation volume factor (gas, oil, water), composition, pressure-volume-temperature (PVT—bubble point pressure, dew point pressure, saturation, critical point, cricondentherm, cricondenbar), z factor, interfacial tension, wettability (oil wet, water wet, mixed, contact angle), hydrophobic, hydrophilic, gas (compressibility, deviation factor, retrograde, ideal), temperature, undersaturated, saturated, heating value.

Pressures—initial, virgin, original, surface, reservoir, flowing, stabilized, static, tubing, casing, bottom hole, gradients, shut in, over, normal, under, hydrostatic, depletion, pore (Pounds per square inch, pascals).

Well—vertical, horizontal, slant, lateral, leg, whipstock, infill, producer, injector, disposal, inactive, drilled but uncompleted (DUC), standing, abandoned, service, offset, orientation, wildcat, exploration, development.

Production rates/flow—oil, gas, water, natural gas liquids, ethane, propane, butane, condensate, marketable, residual, sand, steam, stabilized, slugging, phase flow (single, two, three, multiple).

Ratios: gas-oil, oil-water, water cut, oil cut, gas-water, steam-oil, liquid cut.

Yields: natural gas liquids per barrel, barrels of condensate per million cubic feet gas, surface loss, shrinkage, choke, bulk solids and water.

Absolute open flow potential, flow regime (steady-state, unsteady-state, pseudosteady-state, radial, linear, boundary), productivity index, deliverability, drawdown test, inflow performance test/relationship, pressure transient test or analysis, initial production test, 24 hour test, inflow test, drill stem test, fall off test, flowback test, formation damage, skin, fines, interference, non-Darcy flow, Darcy flow, simulation, pressure-squared, psuedopressure, peak rate, wellbore (fillup, storage).

Primary reservoir drive mechanism or displacement—aquifer, water influx, water drive, solution gas, gas cap, gravity, depletion, dissolved gas, volumetric, expansion.

Secondary and tertiary floods or displacement—enhanced (oil) recovery, improved (oil) recovery, cycling, pressure maintenance.

Injected materials for secondary or tertiary floods—water, miscible, surfactant, alkaline, polymer, gas, nitrogen, fire, in-situ combustion, steam, carbon dioxide, immiscible, vapour (VAPEX), water alternating gas.

Injector(s) and producer(s) configurations for secondary or tertiary floods—pattern, spot (five, nine, inverted, staggered, irregular), line, huff and puff, steam assisted gravity drainage, toe to heel air injection, off pattern.

Breakthrough, viscous fingering, gravity (over ride, under ride, segregation), mobility ratio, stability, coning (gas, water), gas solubility, hysteresis, imbibition, bank, osmotic, plugging. Decline curve—decline rate, exponential, b factor, Arps, (super) hyperbolic, harmonic, terminal decline rate.

Type curve.

Material balance, volumetric.

Commingled.

Efficiencies—sweep, displacement, areal, vertical, conformance factor, volumetric.

Upstream, midstream, downstream.

Depth—measured, true vertical, landing, Kelly bushing, ground, casing flange, mid-point.

B. Rock and Fluid Properties that Control Flow and Reserves

Porosity—effective, gross, net, organic, inorganic, matrix, micro, fracture, void space, secondary, vesicular, vugular, moldic, wormhole.

Permeability (absolute, relative, directional, matrix).

Saturations (water, gas, oil, critical, residual, irreducible, end point, connate).

Area, spacing, vintage, lease, drill spacing unit, drainage area, acreage, hectares, feet, meters, property, compartmentalization, multiphase, play.

Thickness (gross, net).

Volume—bulk, hydrocarbon pore.

Capillary pressure, phase, transition zone.

Compressibility (rock and fluid).

Pores, pore throats, pore throat sizes, tortuosity.

Closure height.

Reserves—producing, proved, probable, possible, contingent, resource, economic, in-place, original, remaining, recovered, undeveloped, estimated ultimate recovery.

Recovery factor.

Acidic, alkali, neutral.

C. Geological Terms

Tectonics, plates, sea, ocean, land, climate, mountain, orogeny, massive, thin, isostasy, isostatic rebound, magnetic, metamorphic, sedimentary, igneous, soft rock, mantle, core, seawater, atmosphere, volcano, tide, terrestrial, uniformitarianism.

Latitude, longitude, Universal Transverse Mercator.

Basin—rift (horst, graben), passive margin, trench (accretionary wedge), forearc, foreland, strike-slip, intracratonic, epicratonic.

Geological Age—Precambrian, Palezoic (Cambrian, Ordovician, Silurian, Devonian, Mississippian, Pennsylvanian, Permian), Mesozoic (Triassic, Jurassic, Cretaceous), Cenozoic (Tertiary, Quaternary).

Layering, facies, thrust, fault, glaciation, zone, correlation, unit, formation, model, top, base, thickness, pay, erosion, weathering, relief, buildup, updip, downdip, dip, strike, deposit, interbedded, plane, subsurface, trend, block, group, frequency, interval, accumulation, Bouguer anomaly, cyclothem, weathering, matrix, subsea, eustasy, hydrothermal, impermeable, karst, lineament, horizon, plateau, platform, strata, subduction, subsalt, subsidence, geochronology, superposition, sedimentation.

Lithology—Grain size and texture—coarse, fine, very fine, density, Udden-Wentworth scale, arenaceous.

Lithology—Rock type and mineralogy—clastic, precipitates (limestone, dolomite, salt), organic (coal, black shale, chalk), breccia, pyroclastic.

Lithology—Small scale structures—cross-bedding, ripple marks, bioturbation.

Lithology—Depositional environment—petrology, deep marine, submarine, turbidite, fan, debris flow, marginal marine, slope, slump, contourite, lithoherm, shelf, reef, interior, peritidal, shallow marine, shoal, mounds, nearshore, coastal, delta, beach, lagoon, estuary, fluvial, lacustrine, swamp, marsh, aeolian, restricted, littoral, abyssal, bathyal, benthic, neritic, floor, margin, sabkha, pelagic, hemipelagic.

Lithology—Diagenetic Processes—lithification, dolomitization, cementation, compaction, thrusting, faulting, drape, transport, regression, transgression, progradation, en echelon, stylolite.

Sorting—homogenous, heterogeneous, skew, log normal.

Mineralogy—quartz, feldspar, calcite, siderite, dolomite, ankerite, pyrite, anhydrite, chlorite, mica, plagioclase, marcasite, halite, barite, anhydrite, gypsum, rhombs, celestite, authigenic, glauconite, bentonite, ash, tuff.

Rocks/Stones—silica, chert, coal, limestone, conglomerate, sandstone, mudstone, siltstone, claystone, shale, calcareous, source rock, fossiliferous, dolostone, diatomite, detrital, detrtitus, argillaceous, evaporate.

Clays—Smectite (montmorillonite, bentonite, gumbo), illite, kaolinite (serpentine), sloughing.

Fossils and animals—paleontology, bioclast (tentaculitids), oolitic, coquina, fossiliferous, pelagic, ostracods, gastropods, brachiopods, bacteria, foraminifera, radiolaria, shells, skeletons.

Stratigraphy—sequence, lithostratigraphy, biostratigraphy, palynology, chronostratigraphy, bed, layer, layer cake, unconformity, conformable, laminated, planar, nodular, framboidal.

Parasequence—maximum flooding surface, systems tract, highstand, lowstand, sequence, stratigraphy, boundary.

Turbidite, beach, dune, bar, off-shore, anoxic, truncated, unconsolidated, consolidated, glacier.

Fault—thrust (over, under), normal, inverse, strike-slip, listric, reverse, sealing, secondary, foot wall, hanging wall, natural, induced, transform, wrench.

Transtension, transpression, flower structure.

Depth, datum, structure, area, thickness, closure, reservoir, surface, sea level, topographic, interface.

Contacts—oil water, gas oil, gas water.

Windows—gas, oil, volatile oil, condensate, rich condensate, lean condensate.

Bitumen, pyrobitumen.

Trap—anticline, syncline, pinchout, stratigraphic, structural, fault, unconformity, salt dome, diapir, hydrodynamic, basin-centered gas, halo, conventional, unconventional, tight sand, tight (gas or oil).

Cap rock, seal, breached.

D. Map Data

Isopach, isochron, velocity, isolith, kh, porosity, pay, kriging, base, show.

Cross-section, grid, dimension.

Model—earth, geological.

Bivariate analysis.

Prospect (location, target).

Chance of Success (chance of source, migration, reservoir, trap and seal).

Net pay, gross pay.

E. Petrophysics, Logging

Logs: Acoustic, (borehole compensated) sonic, density (compensated, bulk), neutron, resistivity, nuclear magnetic resonance, temperature, noise, (spectral) gamma ray, spontaneous potential, caliper, (dual) induction, conductivity, laterlog, lithological, micro (resistivity, laterlog, spherical), repeat formation tester, neutron (pulsed, thermal), tracer, sonolog, echo-meter, wireline.

Investigation (depth, radius).

Archie equation.

R (reflectivity coefficient), Phi (porosity).

F. Core Terms

Tight Rock Analysis—sample ID, depth, density—bulk or grain, effective porosity, saturation—water, gas, mobile oil or bound hydrocarbon, gas-filled porosity, bound clay water, pressure-decay permeability.

Grain density—measured, calculated, XRD.

Gamma Ray—Potassium (K), Thorium (Th), Uranium (U), spectroscopy.

Permeameter, desorption, diffusivity, Dean Stark, GRI crushed shale analysis, pyrolysis, chromatography.

Whole, plug, sidewall, routine.

Petrography.

X-ray diffraction (XRD), X-ray fluorescence (XRF).

G. Geochemical Terms

Biogenic, Thermogenic gas.

Pyrolysis.

Organic matter, kerogen, total organic carbon (TOC).

Maturity, Vitrinite reflectance, Tmax, VRo, Ro.

Kerogen Type—I, II, II and IV.

Coal (Lignite, bituminous, anthracite).

Maturity windows—kitchen, immature, oil, condensate, wet gas, gas, dry gas, overmature catagenesis, metagenesis, inert.

Plots—Van Krevelen, index (hydrogen or oxygen), remaining hydrocarbon potential, S1, S2, S3, production index.

Gas—adsorbed, absorbed, free.

Hydrolisis

H. Geophysical Terms

Seismic (2D, 3D, 4D).

Model, correlate, tie, acquisition, line, process, section.

Travel time, velocity (survey, correction), trace, interval transit time (delta-t), travel time Synthetic wave trace, waveform, wavefront, wavelet, peak, trough, multiphase, spot (bright, dim), ray path, interval velocity, root mean square velocity.

Waves—compressional, shear, primary, wavelength, reflection, propagation, diffraction, refraction (Snell's law), transmission, noise, frequency, surface, Love, P-wave, Q-wave, S-wave, Rayleigh, ground roll.

Acoustic impedence, reflection coefficient, impedence contrast, polarity.

Data processing—common midpoint gather, migration, deconvolution, stacking, statics, correction.

Time slice, time to depth conversion.

Shot point, discontinuity.

Resolution, detectability, filter, signal to noise, channels, seismic tie, bandwidth, broad-band.

(Offset) vertical seismic profile.

Tomography, reflectivity, elastic.

Seismogram, seismograph, seismite.

I. Geomechanical Terms

Brittleness, Poisson's ratio, Elastic properties, Biot's constant, dynamic, ductile, Stoneley wave.

Modulus—Young's, bulk, shear.

Stress and or strain—longitudinal, hydrostatic, volumetric, shear, in-situ, minimum, maximum, orientation, azimuth, closure, triaxial, net confining, anisotropic, isotropic, yield, horizontal (maximum, minimum), vertical, effective, simple, normal, clamping.

Pore pressure (gradient).

Overburden.

Friction.

(Unconfined) Compressive strength.

Seismicity, induced seismicity, earthquake, temblor, tremor, magnitude (local, moment), Richter scale, shaking index, Modified Mercalli Intensity, peak (acceleration, velocity), felt seismicity, clusters, slip, rupture.

Mohr circle, stereonet.

In some embodiments, management entity 106 may be in communication with database 108. Database 108 may be configured to store information associated with genetic algorithms 122. For example, database 108 may include mutations 132 and results 134. Each mutation 132 may be representative of one possible mutation of a respective genetic algorithm 122. Each mutation 132 may include configuration information associated therewith, such as completion designs or spacing configurations. Results 134 may correspond to each overall fitness score generated by well trajectory agent 120 given configuration information, the one or more parameters, and the one or more constraints. Each result 134 may correspond to a given mutation 132.

Figure 2:
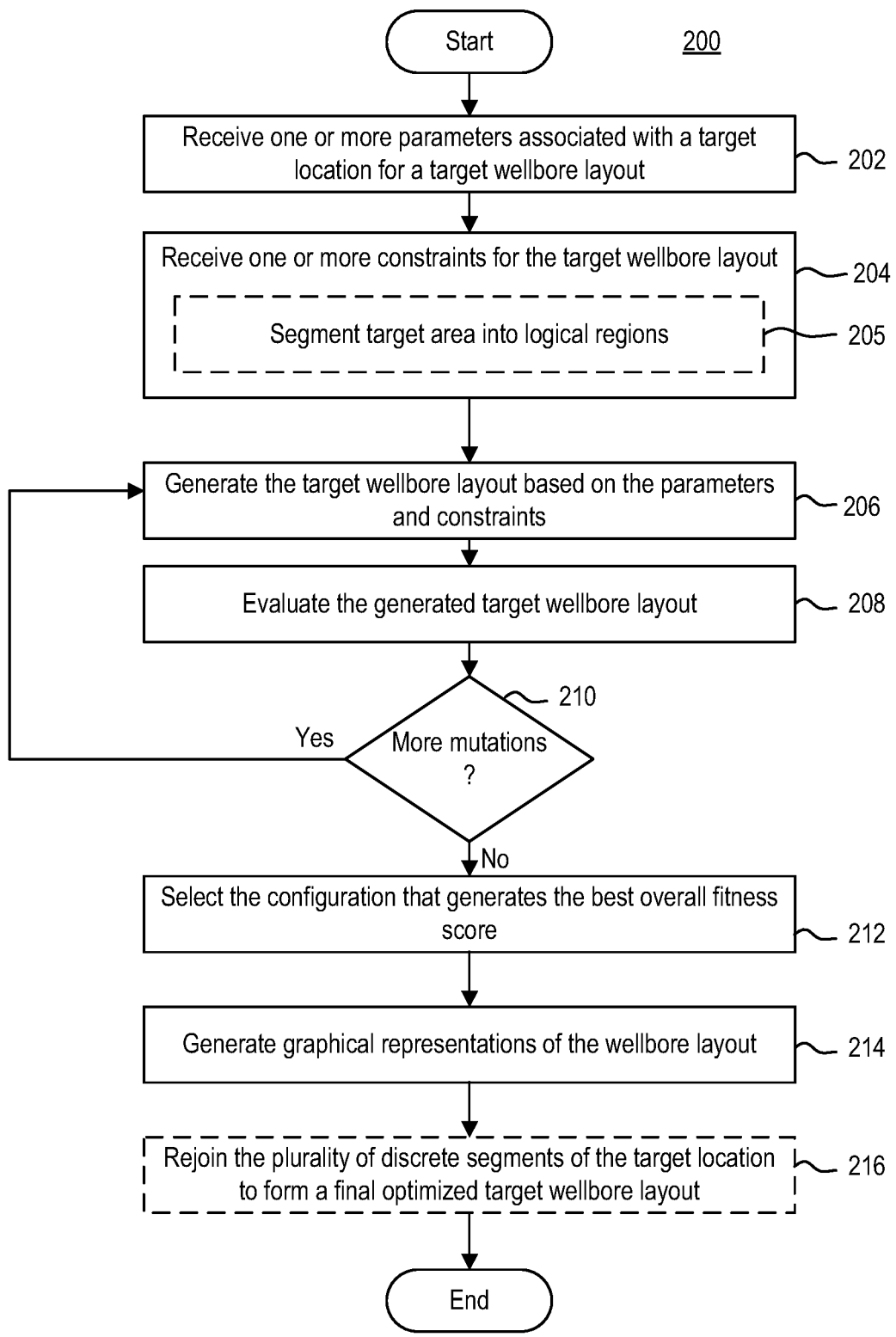
FIG. 2 is a flow diagram illustrating an exemplary method of generating a projected wellbore layout, according example embodiments.

FIG. 2 is a flow diagram illustrating a method 200 of generating a well placement optimization three-dimensional model, according to exemplary embodiments. FIGS. 3A1-3C2 are graphical user interfaces (GUIs) illustrating front-end counterparts of various operations in method 200, according to example embodiments. Method 200 may begin at step 202.

At step 202, well trajectory agent 120 may receive one or more parameters associated with a target location for a target wellbore layout. For example, well trajectory agent 120 may receive a target location from a user device, and retrieve, for that target information, existing wellbores in the target location, geological information of the target information, operator of each wellbore (existing or to-be-generated) in the target location, and performance of each existing wellbore in the target location. In some embodiments, well trajectory agent 120 may receive more fine-tuned parameters such as intervals and based filters in the target location. For example, when selecting a target location of "Delaware," a user may further define the location to include intervals (e.g., 1st Bone Spring, 2nd Bone Spring, 2nd Bone Spring Sand, 3rd Bone Spring, 3rd Bone Spring Sand, etc.), as well as a fairway of interest (e.g., Full Play). In some embodiments, well trajectory agent 120 may receive more fine-tuned parameters such as well control cut offs. By defining well control cut offs, well trajectory agent 120 may buffer out those wells that meet criteria, such as, but not limited to EUR cutoff, percentage of liquids, break even, and the like.

Figure 3A1:
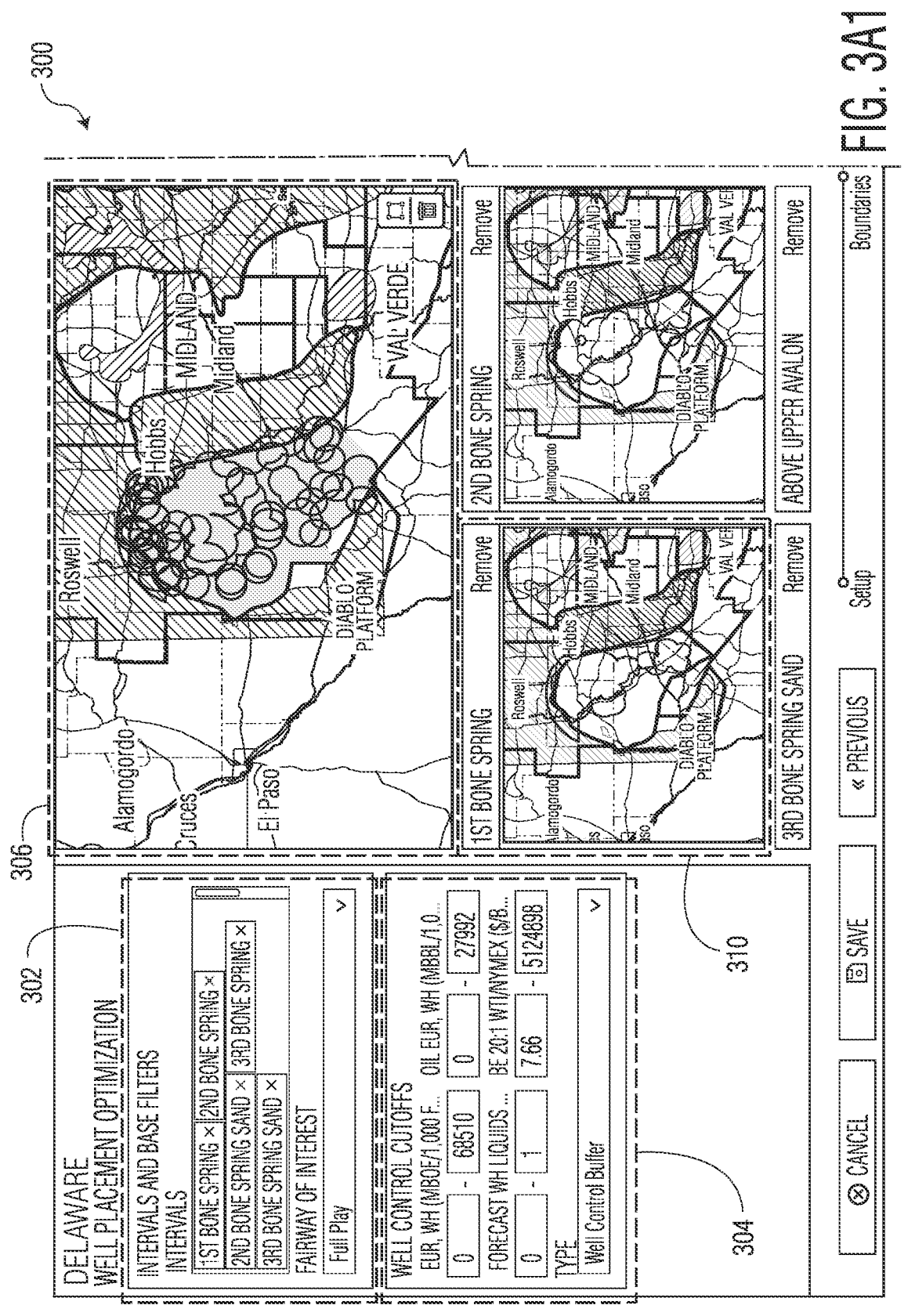

FIGS. 3A1 and 3A2 illustrate an exemplary GUI 300, according to example embodiments. Exemplary GUI 300 is illustrated across two figures so that the details of GUI 300 may be more readily apparent. GUI 300 may illustrate the front-end counterpart to the functionality discussed in step 202. For example, as illustrated, GUI 300 may include one or more graphical elements 302-310. Graphical element 302 may correspond to an input field, in which a user may select various intervals and based filters for a given target location. Graphical element 304 may correspond to an input field for well control cutoffs. As illustrated, graphical element 306 may display a map that illustrates the target location, as well as various intervals contained in the target location. Graphical element 308 may illustrate one or more parameters associated with the target location. For example, graphical element 308 may provide information about each selected interval, such as, but not limited to, acres, horizontal well count, EUR mean, well head percent liquids mean, proppant intensity mean, fluid intensity mean, lateral length mean, and the like. Graphical element 310 may display a map that illustrates a particular selected interval from the target location. For example, graphical element 310 may visually depict the boundary surrounding a particular interval, such as, 1st Bone Spring.

At step 204, well trajectory agent 120 may receive one or more constraints for the target wellbore layout. For example, well trajectory agent 120 may receive bounds by which users want to optimize the input land. In some embodiments, the one or more constraints may include information directed to drilling spacing units to be included in the target location. For example, well trajectory agent 120 may receive spacing and lateral length information directed to new drilling spacing units. In some embodiments, the one or more constraints may include information directed to infills to be included in the target location. For example, well trajectory agent 120 may leverage spacing and lateral length information to infill drilling of wells in spaces between existing wells.

In some embodiments, the one or more constraints for the target wellbores may include large tracts of land, exponentially increasing the complexity of the problem space. In such embodiments, step 204 may include a sub-step 205. At sub-step 205, well trajectory agent 120 may segment the target area into logical regions. Well trajectory agent 120 may use systems including, but not limited to, shape classification, geological features, existing well bores to identify contiguous patterns in the target area. In some embodiments, well trajectory agent 120 may classify land grid shapes into regular geometric types, such as squares, rectangles, or other. Well trajectory agent 120 may attach prevailing azimuth values to each grid by sampling points contained within the shape boundary and performing a Principal Component Analysis on the two-dimensional values. Well trajectory agent 120 may identify and use a most significant component of the set (e.g., the direction of highest variation) as a proxy for the apparent prevailing direction of each grid.

In some embodiments, well trajectory agent 120 may use these derived features to connect similar and related grids with a combination of graph theory, e.g., interconnecting grids that form regular patterns. In some embodiments, well trajectory agent 120 may leverage unsupervised clustering to respect or ignore the contour of regular, square land parcels due to spatial relations with existing well bores or other features. Well trajectory agent 120 may leverage an ensemble of these methods depending on user heuristics or other local features. These patterns may be distilled into discrete areas where placements or well bores may interact with positive or negative effect. This segmentation may allow the optimizer subsystems to properly account for interaction of the various placements, as detailed below, but remain performant and parallel for target areas the size of a drilling basin or larger.

In some embodiments, the one or more constraints for the target wellbore layout may include completion design information. For example, well trajectory agent 120 may receive completion design information that includes, but is not limited to, water intensity, average stage spacing, fluid intensity, proppant intensity, and the like. These potential designs are applied to resulting well placements to estimate and optimize target metrics.

In some embodiments, the one or more constraints for the target wellbore layout may include one or more economic inputs. For example, well trajectory agent 120 may receive economic constraints that include, but are not limited to, commodity assumptions (e.g., oil hub, gas hub, etc.), differentials (e.g., oil differential percentage, natural gas liquid (NGL) percentage, gas differential percentage, etc.), operating and transport information (e.g., variable operating expenses, transportation costs, fixed operating expenses, etc.), processing fees (e.g., processing fee, NGL yield, gas shrink percentage, etc.), royalty rates (e.g., royalty rate oil percentage, royalty rate gas percentage, royalty rate NGL percentage), severance tax information (e.g., oil severance tax percentage, NGL severance tax percentage, gas severance tax percentage, etc.), and the like.

At step 206, well trajectory agent 120 may generate the target wellbore layout based on the one or more parameters of the target location and the one or more constraints. Well trajectory agent 120 may generate the target wellbore layout given a configuration defined by a particular mutation of genetic algorithms 122. For example, well trajectory agent 120 may pack the target location with new drilling spacing units based on configuration information defined by genetic algorithms 122. Well trajectory agent 120 may also incorporate physical spatial restrictions to allocate tracts of land to Drilling Spacing Units: contiguous areas of similarly aligned, owned, spaced, and completed wells. The agent packs DSUs by placing shapes of purchased land inside the known area in order to optimize usage based on constraints and user specifications. In particular, well trajectory agent 120 may pack the target location with new drilling spacing units based on, for example, existing drilling spacing units, geographic information of the target area, completion design information, and the like. The packs may be optimized for land usage, to conform to existing infrastructure, according to user defined direction, or a combination. Well trajectory agent 120 may then infill bores into the target location based on the existing drilling spacing units and the newly placed drilling spacing units. Finally, well trajectory agent 120 may take into consideration the spacing information provided by the user during initialization. For example, well trajectory agent 120 may ensure that each well (existing drilling spacing units, new drilling spacing units, and infill wells) are spaced in accordance with the received constraints and selected spacing optimizes the objective metric for land usage, such as Net Present Value or EUR.

FIG. 3B is an exemplary GUI 350, according to example embodiments. GUI 300 may illustrate the front-end counterpart to the functionality discussed in steps 206 and 208. For example, as illustrated, GUI 350 may include one or more graphical elements 352-356. Graphical element 352 may correspond to an input field associated with desired spacing and lateral length information. In some embodiments, such as that illustrated in FIG. 3B, a user may be provided with a sliding scale that allows the user to select an upper bound and a lower bound on a desired number of drilling spacing units and infills. Graphical element 354 may correspond to one or more input fields associated with completion designs. Graphical element 356 may correspond to one or more input fields associated with economic constraints.

At step 208, well trajectory agent 120 may evaluate the generated target wellbore layout. For example, well trajectory agent 120 may be configured to generate one or more wellbore paths in the target location, given the existing drilling spacing unit information, the new drilling spacing unit information, and the infill drilling information. For each wellbore path, well trajectory agent 120 may be configured to generate a well cost. Given expenses of historical well operations, the well cost module estimates the cost of operating the wells proposed by the agent. Combining the well cost with the economic assumptions and production estimates (which stem from which wells are placed and their completion/spacing/other components), well trajectory agent 120 may generate an overall fitness score for the wellbore layout.

At decision block 210, well trajectory agent 120 determines if there are any mutations left in genetic algorithms 122. For example, well trajectory agent 120 may determine if genetic algorithms 122 has iterated throughout all of its states. In each state, genetic algorithm 122 may generate a different set of parameters to be provided to well trajectory agent 120 for calculation of the overall fitness score.

If, at decision block 210, there are generations left, method 200 reverts to step 206 and well trajectory agent 120 mutates the highest performing solutions into similar but stochastically different configurations based on the user's constraints. If, however, at decision block 210, there are no generations left, then method 200 proceeds to step 212.

At step 212, well trajectory agent 120 chooses the configuration that generates the best overall fitness score. In some embodiments, the configuration that generates the best overall fitness score is considered the "optimized" wellbore layout.

At step 214, well trajectory agent 120 may provide a graphical representation of the wellbore layout to an end user. For example, in some embodiments, such as when multiple wellbore layouts are generated, well trajectory agent 120 may select the highest scoring wellbore layout and generate a graphical representation of that highest scoring wellbore layout. In some embodiments, the graphical representation may be color-coded so that an end user may visually identify which drilling spacing units preexist and which drilling spacing units are new.

FIGS. 3C1 and 3C2 illustrate an exemplary GUI 370, according to example embodiments. Exemplary GUI 370 is illustrated across two figures so that the details of GUI 370 may be more readily apparent. GUI 370 may illustrate the front-end counterpart to the functionality discussed in step 210. For example, as illustrated, GUI 370 may include one or more graphical elements 372-380. Graphical element 372 may correspond to the graphical representation of the wellbore layout generated by well trajectory agent. For example, as illustrated, graphical element 372 may visually illustrated to new wellbore layout, denoting existing drilling spacing units in a first color and new drilling spacing units in a second color. Graphical element 374 may correspond to a chart that visually illustrates production (oil, gas, BOE etc) levels across a plurality of months, based on the generated layout. Graphical element 376 may include various information directed to the new wellbore layout. For example, graphical element 376 may include information directed to each drilling spacing unit in the wellbore layout. Such information may include, but is not limited to, lateral length mean, EUR, break event value, total completion records, and the like. Graphical element 378 may correspond to a chart that illustrates EUR versus break even value for each drilling spacing unit. In some embodiments, graphical element 378 may color each plot point, according to whether to plot point represents an existing wellbore or a new wellbore placed by the model. Graphical element 380 may correspond to a chart that illustrates EUR versus the well cost. In some embodiments, graphical element 380 may color each plot point, according to whether to plot point represents a new wellbore placed by the model.

In some embodiments, method 200 may include step 216. At step 216, based on the chosen configuration, well trajectory agent 120 may rejoin the plurality of discrete segments of the target location to form a final optimized target wellbore layout. For example, in such embodiments where well trajectory agent 120 may segment the target area into a plurality of discrete rejections, well trajectory agent 120 may subsequently rejoin the plurality of discrete segments to generate a final optimized target wellbore layout.

Figure 4:
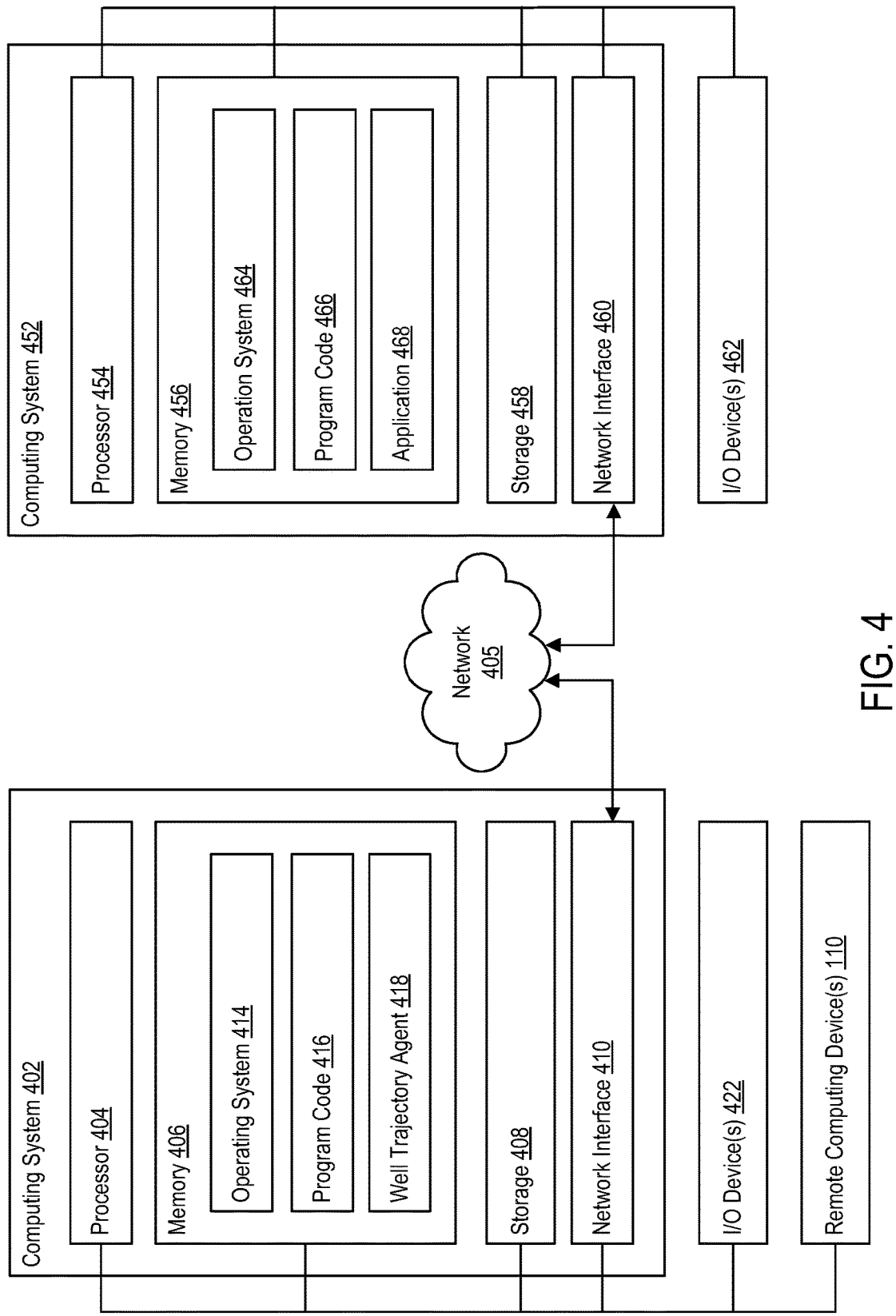
FIG. 4 is a block diagram illustrating an exemplary computing environment, according example embodiments.

FIG. 4 illustrates a computing environment 400, according to one embodiment. Computing environment 400 includes computing system 402 and computing system 452 communicating over network 405. Computing system 402 may be representative of management entity 106. Computing system 452 may be representative of client device 102.

Computing system 402 may include processor 404, memory 406, storage 408, and network interface 410. In some embodiments, computing system 402 may be coupled to one or more I/O devices 422 (e.g., keyboard, mouse, monitor, etc.). In some embodiments, computing system 402 may be in communication with one or more remote computing devices 110.

Processor 404 retrieves one executes program code 416 (i.e., programming instructions) stored in memory 406, as well as stores and retrieves application data. Processor 404 may be representative of a single processor, multiple processors, a single processor having multiple processing cores, and the like. Network interface 410 may be any type of network communications enabling computing system 402 to communicate externally via network 405. For example, network interface 410 may allow computing system 402 to communicate with computing system 452.

Storage 408 may be, for example, a disk storage device. Although shown as a single unit, storage 408 may be a combination of fixed and/or removable storage devices, such as fixed disk drives, removable memory cards, optical storage, network attached storage (NAS), storage area network (SAN), and the like.

Memory 406 may include operating system 414, program code 416, and well trajectory agent 418. Program code 416 may be accessed by processor 404 for processing (i.e., executing program instructions). Program code 416 may include, for example, executable instructions configured to perform steps discussed above in conjunction with FIG. 2. For example, program code 416 may include executable instructions for optimizing a wellbore layout for a target location.

Well trajectory agent 418 may be configured to generate a drilling program for a wellbore. In some embodiments, the drilling program may include an optimized or near-optimized wellbore layout for a given location. For example, well trajectory agent 418 may be configured to received, from computing system 452, various parameters for a proposed wellbore layout. Given the various parameters, well trajectory agent 418 may generate an optimized or near-optimized wellbore layout for the target location based on, for example, one or more of the various parameters and historical information associated with the target location and/or similar target locations. For example, well trajectory agent 418 may generate the wellbore layout using historical wellbore information associated with wellbore paths that already exist in the target location and in different, but similar locations.

Computing system 452 may include processor 454, memory 456, storage 458, and network interface 460. In some embodiments, computing system 452 may be coupled to one or more I/O devices 462.

Processor 454 retrieves one executes program code 466 (i.e., programming instructions) stored in memory 456, as well as stores and retrieves application data. Processor 454 may be representative of a single processor, multiple processors, a single processor having multiple processing cores, and the like. Network interface 460 may be any type of network communications enabling computing system 452 to communicate externally via network 405. For example, network interface 460 may allow computing system 452 to communicate with computing system 402.

Storage 458 may be, for example, a disk storage device. Although shown as a single unit, storage 458 may be a combination of fixed and/or removable storage devices, such as fixed disk drives, removable memory cards, optical storage, network attached storage (NAS), storage area network (SAN), and the like.

Memory 456 may include operating system 464, program code 466, and application 468. Program code 466 may be accessed by processor 454 for processing (i.e., executing program instructions). Program code 466 may include, for example, executable instructions configured to perform steps discussed above in conjunction with FIGS. 2-3C2

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of generating a wellbore layout, comprising:
    receiving, from a client device at a computing system, one or more parameters associated with a target location for a target wellbore layout;
    receiving, from the client device at the computing system, one or more constraints for the target wellbore layout;
    segmenting, by the computing system, the target location into a plurality of logical regions based on geographical attributes of the target location;
    for each logical region, generating, by the computing system, a plurality of target wellbore layouts based on the one or more parameters and constraints in accordance with a plurality of configurations as defined by one or more genetic algorithms by generating, for each target wellbore layout of the plurality of target wellbore layouts, a plurality of proposed wellbores to be included into the target location based on the one or more parameters and the one or more constraints;
    for each logical region, evaluating, by the computing system, each target wellbore layout to generate an overall fitness score;
    for each logical region, selecting, by the computing system, a target wellbore layout from the plurality of target wellbore layouts that has the highest overall fitness score;
    rejoining, by the computing system, the plurality of logical regions to generate an overall target wellbore layout, the overall target wellbore layout comprising each target wellbore layout that had the highest overall fitness score for a corresponding logical region; and
    causing, by the computing system, at least one drill to execute a portion of a drilling program based on the overall target wellbore layout by providing the overall target wellbore layout to a controller associated with the at least one drill.

2. The method of claim 1, wherein for each logical region, evaluating, by the computing system, each target wellbore layout to generate the overall fitness score comprises:
    estimating a cost to operate wells in the target wellbore layout given historical well operation data for existing wells in the target wellbore layout.

3. The method of claim 2, further comprising:
    generating a production estimate for the target wellbore layout given the historical well operation data; and
    combining the production estimate with the cost estimate to generate the overall fitness score.

4. The method of claim 1, wherein each configuration of the plurality of configurations comprises spatial restrictions related to existing wells, infill wells, and new wells in the target location.

5. The method of claim 1, further comprising:
    generating, by the computing system, a graphical representation of the overall target wellbore layout that had the highest overall fitness score for display on the client device.

6. A system comprising:
    a processor; and
    a memory having programming instructions stored thereon, which, when executed by the processor, performs one or more operations comprising:
        receiving, from a client device, one or more parameters associated with a target location for a target wellbore layout;
        receiving, from the client device, one or more constraints for the target wellbore layout;
        segmenting the target location into a plurality of logical regions based on geographical attributes of the target location;
        for each logical region, generating a plurality of target wellbore layouts based on the one or more parameters and the one or more constraints in accordance with a plurality of configurations as defined by one or more genetic algorithms by generating, for each target wellbore layout of the plurality of target wellbore layouts, a plurality of proposed wellbores to be included into the target location based on the one or more parameters and the one or more constraints;
        for each logical region, evaluating each target wellbore layout to generate an overall fitness score;
        for each logical region, selecting a target wellbore layout that has the highest overall fitness score;
        rejoining, by the computing system, the plurality of logical regions to generate an overall target wellbore layout, the overall target wellbore layout comprising each target wellbore layout that had the highest overall fitness score for a corresponding logical region; and
        causing at least one drill to execute a portion of a drilling program based on the overall target wellbore layout by providing the overall target wellbore layout to a controller associated with the at least one drill.

7. The system of claim 6, wherein the one or more operations further comprise:

generating a graphical representation of the overall target wellbore layout that had the highest overall fitness score for display on the client device.

8. The system of claim 6, wherein for each logical region, evaluating each target wellbore layout to generate the overall fitness score comprises:
estimating a cost to operate wells in the target wellbore layout given historical well operation data for existing wells in the target wellbore layout.

9. The system of claim 8, further comprising:
generating a production estimate for the target wellbore layout given the historical well operation data; and
combining the production estimate with the cost estimate to generate the overall fitness score.

10. The system of claim 6, wherein each configuration of the plurality of configurations comprises spatial restrictions related to existing wells, infill wells, and new wells in the target location.

11. A non-transitory computer readable medium including one or more instructions which, when executed by one or more processors, cause the one or more processors to perform operations comprising:
receiving, from a client device at a computing system, one or more parameters associated with a target location for a target wellbore layout;
receiving, from the client device at the computing system, one or more constraints for the target wellbore layout;
segmenting, by the computing system, the target location into a plurality of logical regions based on geographical attributes of the target location;
for each logical region, generating, by the computing system, a plurality of target wellbore layouts based on the one or more parameters and constraints in accordance with a plurality of configurations as defined by one or more genetic algorithms by generating, for each target wellbore layout of the plurality of target wellbore layouts, a plurality of proposed wellbores to be included into the target location based on the one or more parameters and the one or more constraints;
for each logical region, evaluating, by the computing system, each target wellbore layout to generate an overall fitness score;
for each logical region, selecting, by the computing system, a target wellbore layout from the plurality of target wellbore layouts that has the highest overall fitness score;
rejoining, by the computing system, the plurality of logical regions to generate an overall target wellbore layout, the overall target wellbore layout comprising each target wellbore layout that had the highest overall fitness score for a corresponding logical region; and
causing, by the computing system, at least one drill to execute a portion of a drilling program based on the overall target wellbore layout by providing the overall target wellbore layout to a controller associated with the at least one drill.

12. The non-transitory computer readable medium of claim 11, further comprising:
generating, by the computing system, a graphical representation of the overall target wellbore layout that had the highest overall fitness score for display on the client device.

13. The non-transitory computer readable medium of claim 11, wherein for each logical region, evaluating, by the computing system, each target wellbore layout to generate the overall fitness score comprises:
estimating a cost to operate wells in the target wellbore layout given historical well operation data for existing wells in the target wellbore layout.

14. The non-transitory computer readable medium of claim 13, further comprising:
generating a production estimate for the target wellbore layout given the historical well operation data; and
combining the production estimate with the cost estimate to generate the overall fitness score.

* * * * *